US010732386B2

(12) United States Patent
Lai

(10) Patent No.: US 10,732,386 B2
(45) Date of Patent: Aug. 4, 2020

(54) OPTICAL LENS SYSTEM

(71) Applicant: HON HAI PRECISION INDUSTRY CO., LTD., New Taipei (TW)

(72) Inventor: Cheng-Yi Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 205 days.

(21) Appl. No.: 15/947,928

(22) Filed: Apr. 9, 2018

(65) Prior Publication Data

US 2019/0243094 A1  Aug. 8, 2019

Related U.S. Application Data

(60) Provisional application No. 62/627,804, filed on Feb. 8, 2018.

(51) Int. Cl.
*G02B 13/00* (2006.01)
*G02B 13/18* (2006.01)
*G02B 9/62* (2006.01)
*G02B 13/06* (2006.01)

(52) U.S. Cl.
CPC .......... *G02B 13/0045* (2013.01); *G02B 9/62* (2013.01); *G02B 13/06* (2013.01); *G02B 13/18* (2013.01)

(58) Field of Classification Search
CPC ...... G02B 13/0045; G02B 9/62; G02B 13/06; G02B 13/18
USPC ........................................................ 359/708
See application file for complete search history.

(56) References Cited

U.S. PATENT DOCUMENTS

| 2006/0274433 | A1* | 12/2006 | Kamo ............... G02B 13/0095 359/793 |
| 2010/0085651 | A1* | 4/2010 | Asami ..................... G02B 9/62 359/752 |
| 2016/0223790 | A1* | 8/2016 | Liao .................. H01L 21/02085 |
| 2017/0031133 | A1* | 2/2017 | Liu ...................... G02B 27/646 |
| 2017/0031134 | A1* | 2/2017 | Liu ........................ G02B 13/06 |
| 2017/0045715 | A1* | 2/2017 | Tang ....................... G02B 9/62 |
| 2017/0045716 | A1* | 2/2017 | Tang .................. G02B 13/0045 |
| 2017/0052345 | A1* | 2/2017 | Tang .................. G02B 13/0045 |
| 2017/0052346 | A1* | 2/2017 | Tang .................. G02B 13/0045 |
| 2017/0052347 | A1* | 2/2017 | Tang ....................... G02B 9/62 |
| 2017/0052348 | A1* | 2/2017 | Tang ....................... G02B 9/62 |
| 2017/0059820 | A1* | 3/2017 | Tang ..................... G02B 13/06 |
| 2017/0059822 | A1* | 3/2017 | Tang ..................... G02B 13/06 |
| 2017/0068070 | A1* | 3/2017 | Tang .................. G02B 13/0045 |
| 2017/0068071 | A1* | 3/2017 | Tang .................. G02B 13/0045 |
| 2017/0227736 | A1* | 8/2017 | Lai ......................... G02B 5/20 |
| 2017/0227737 | A1* | 8/2017 | Lai ...................... G02B 13/146 |
| 2017/0227738 | A1* | 8/2017 | Lai ........................ G02B 13/06 |
| 2017/0227739 | A1* | 8/2017 | Lai ........................ G02B 13/04 |
| 2017/0235102 | A1* | 8/2017 | Lai ........................... G02B 9/62 359/713 |

(Continued)

*Primary Examiner* — James R Greece
(74) *Attorney, Agent, or Firm* — ScienBiziP, P.C.

(57) ABSTRACT

An optical lens system of the present disclosure assembly includes, in order from an object side to an image side, a first lens element, a second lens element, a third lens element, a fourth lens element, a fifth lens element, a sixth lens element, an optical filter and a sensor. The first lens element and the fourth lens element each have a negative power. The second lens element, the third lens element, the fifth lens element and the sixth lens element each have a positive power.

12 Claims, 9 Drawing Sheets

(56) References Cited

U.S. PATENT DOCUMENTS

| | | | |
|---|---|---|---|
| 2017/0235103 A1* | 8/2017 | Lai | G02B 7/04 |
| | | | 359/713 |
| 2017/0269335 A1* | 9/2017 | Lai | G02B 9/62 |
| 2017/0269336 A1* | 9/2017 | Lai | G02B 13/0045 |
| 2018/0106979 A1* | 4/2018 | Chang | G02B 27/0025 |
| 2018/0106985 A1* | 4/2018 | Chang | G02B 1/04 |
| 2018/0188489 A1* | 7/2018 | Chang | G02B 13/008 |
| 2018/0188490 A1* | 7/2018 | Chang | G02B 13/0045 |
| 2018/0188494 A1* | 7/2018 | Chang | G02B 9/62 |
| 2018/0188495 A1* | 7/2018 | Chang | G02B 13/0045 |

* cited by examiner

OPTICAL LENS SYSTEM

FIELD

The subject matter herein generally relates to a lens, especially, relates to an optical lens system.

BACKGROUND

In a field of photography, an optical lens is used to acquire visible light to capture the images. Moreover, a wide angle optical lens can acquire more visible light and more widely used in certain photographic settings.

Generally, to create more compact optical systems, the size of image sensor has be less reduced. If we keep the same resolution in reduced size(less) sensors, the pixel size will have to be less, and this may result in color aberration. Accordingly, reducing color aberration has became more important to optical system designers. In order to get a high quality image with a super wide angle lens, aberration needs to be reduced. Accordingly, there is room for improvement within the art.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
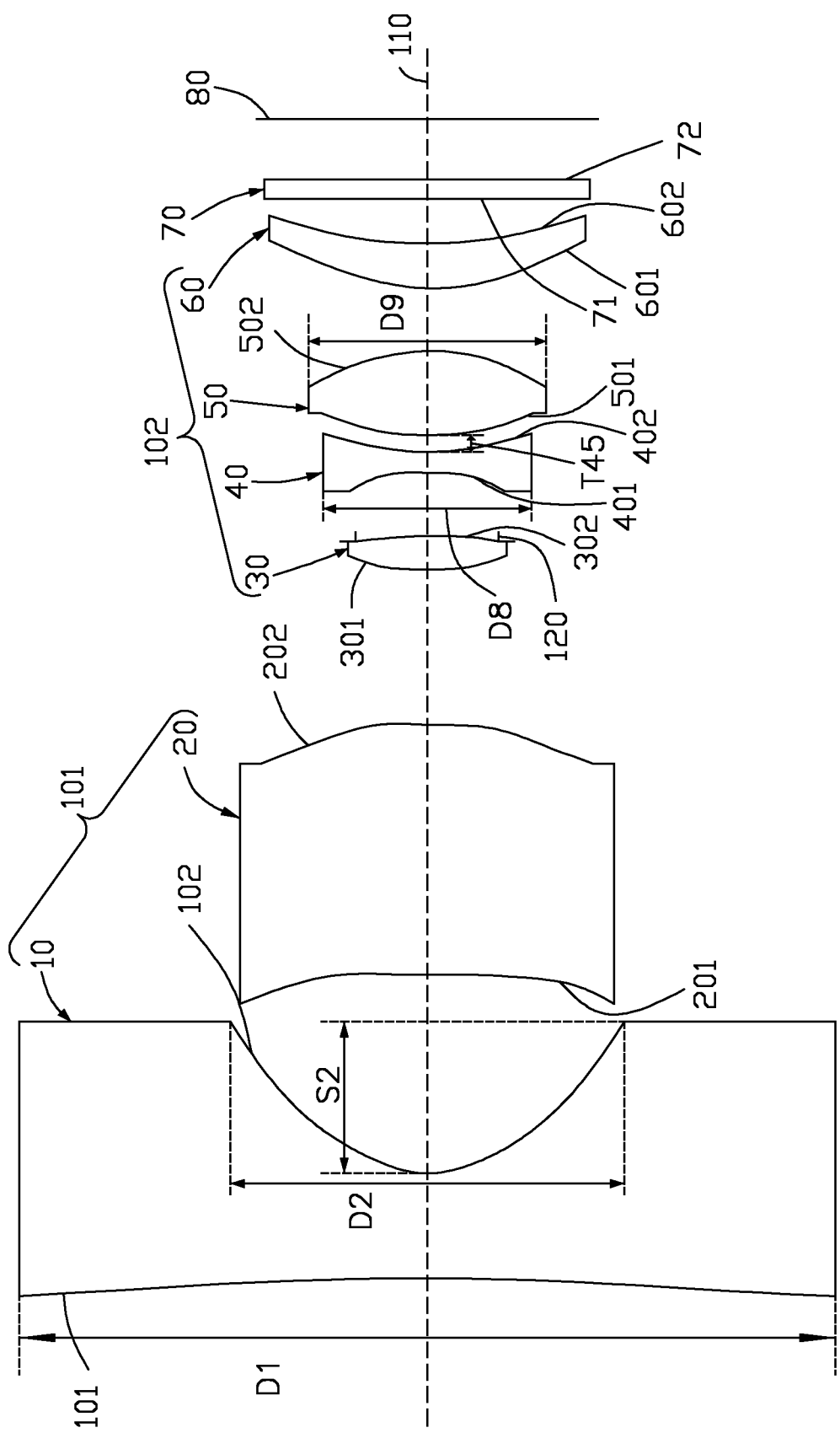
FIG. 1 is a diagrammatic, cross sectional view of an optical lens system of the present disclosure.

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

An optical lens system of the present disclosure assembly includes a plurality of discrete elements, and in order from an object side to an image side, comprise: a first lens element 10, a second lens element 20, a third lens element 30, a fourth lens element 40, a fifth lens element 50, a sixth lens element 60, an optical filter 70 and an image sensor 80.

The first lens element 10 and the second lens element 20 define a first lens group 1001.

The third lens element 30, the fourth lens element 40, the fifth lens element 50 and the sixth lens element 60 define a second group 1002.

The optical lens system also has an optical axis 110. The first lens element 10, a second lens element 20, a third lens element 30, a fourth lens element 40, a fifth lens element 50 and a sixth lens element 60 are symmetrical about the optical axis 110.

The first lens element 10 has negative power. As used herein, negative power means the lens reduces the size of the image of the object. The first lens element 10 has a first surface 101 and a second surface 102 opposite to the first surface 101. The first surface 101 is aspheric and convex about the optical axis 110 and toward the object side. The second surface 102 is aspheric. A center of the second surface 102 is concave about the optical axis 110 and toward the image side. A periphery of the second surface 102 is a flat surface.

The second lens element 20 has positive power. As used herein, positive power means the lens magnifies the size of the image of the object. The second lens element 20 has a third surface 201 and a fourth surface 202. The third surface 201 is aspheric and is concave about the optical axis 110 and toward the object side. The fourth surface 202 is aspheric and is convex about the optical axis 110 and toward the image side.

The third lens element 30 has positive power. The third lens element 30 has a fifth surface 301 and a sixth surface 302. The fifth surface 301 is aspheric and is convex about the optical axis 110 and toward the object side. The sixth surface 302 is aspheric. The sixth surface 302 is convex about the optical axis 110 and toward the image side.

The fourth lens element 40 has negative power. The fourth lens element 40 has a seventh surface 401 and an eighth surface 402. A center of the seventh surface 401 is concave about the optical axis 110 and toward the object side. The eighth surface 402 is concave about the optical axis 110 and toward the image side.

An aperture 120 is located between the third lens element 30 and the fourth lens element 40. The aperture 120 is symmetric about the optical axis 110. A distance between the aperture 120 and the sixth surface 302 is less than a distance between the aperture 120 and the seventh surface 401.

The fifth lens element 50 has positive power. The fifth lens element 50 has a ninth surface 501 and a tenth surface 502. Both the ninth surface 501 and the tenth surface 502 are aspheric. The ninth surface 501 is convex about the optical axis 110 and toward the object side. The tenth surface 502 is convex about the optical axis 110 and toward the image side.

The sixth lens element 60 has positive power. The sixth lens element 60 has an eleventh surface 601 and a twelfth surface 602. The eleventh surface 601 is aspheric. The eleventh surface 601 is convex about the optical axis 110 and toward the object side. The twelfth surface 602 is concave about the optical axis 110 and toward the image side.

The optical filter 70 has a front surface 71 and a rear surface 72. The front surface 71 and the rear surface are flat planes. The optical filter 70 can filter infrared light passing through the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 are aspherical surfaces. The even-numbered aspherical surface are shaped according to the formula:

$$Z = \frac{ch^2}{1 + \sqrt{1 - (k+1)c^2h^2}} + \sum A_i h^i \quad (a)$$

Wherein Z is aspherical surface sag of surface, h is a surface height from the optical axis 110, c is a curvature, k is a conic constant, and Ai are i-th order aspheric coefficients of surface.

The optical lens system satisfies the formulas:

$$0.88 < (EFLG1 - EFLG2)/(EFLG1 + EFLG2) < 1.11 \quad (1);$$

$$0.01 < T45 * D8/D9 < 0.71 \quad (2);$$

$$20 < (V3 - V4)/(N4 - N3) < 1020 \quad (3);$$

$$20 < (V5 - V4)/(N4 - N5) < 1020 \quad (4);$$

$$1.14 < (f1 * f3)/(f4 * f5) < 4.57 \quad (5);$$

$$0.1 < TTL/(D1 * IMH) < 0.91 \quad (6);$$

$$100° < 2\omega < 179° \quad (7);$$

$$1.36 < |D1/D2| < 4.78 \quad (8);$$

$$1.53 < |D2/S2| < 5.63 \quad (9)$$

Wherein, EFLG1 is the focal length of the first lens group 1001. EFLG2 is the focal length of the second lens group 1002. T45 is a center thickness of anair space between the eighth surface 402 and the ninth surface 501. D8 is the diameter of the eighth surface 402. D9 is the diameter of the ninth surface 501. V3 is the abbe number of the third lens element 30. V4 is the abbe number of the fourth lens element 40. V5 is the abbe number of the fifth lens element 50. N3 is the refraction index of the third lens element 30. N4 is the refraction index of the fourth lens element 40. N5 is the refraction index of fifth lens element 50. F1 is the focal length of the first lens element 10. F3 is the focal length of the third lens element 30. F4 is the focal length of the fourth element 40. F5 is the focal length of the fifth lens element 50. TTL is total length along the optical axis 110; as measured from center point of the first surface 101 to the sensor 80. D1 is aperture diameter of the first lens element 10. D2 is aperture diameter of the second lens element 20. S2 is a sag value of maximum effective aperture of the second surface 102 of the first lens element 10. IMH is the maximum image circle of the sensor 80. ω is a half field view angle of the optical lens system.

The formulas (1)-(4) are used to reduce the aberration of the optical lens system and improve the image quality for super wide angle optical lens system. The formula (5) is used to balance the optical power of the first lens element 10, the third lens element, the fourth lens element and the fifth lens element, and improve the tolerance sensitivity of the optical lens system. The formula (6) is used to define the ratio of the optical lens system and maximum image circle. The formula (7) is used to define the view angle of the optical lens system. The formulas (8)-(9) are used to control the ratio of the surfaces diameter and radius of the first lens element 10 and the second lens element 20 to ease the manufacturability of the optical lens system.

The following embodiment specifically illustrates the optical lens system according to different parameter.

Tables 1-2 illustrate an optical lens system of a first embodiment. In the first embodiment, the optical lens system satisfies the parameter of tables 1-2. The symbols listed below are used in tables 1-2.

R: a radius of curvature.
L: a distance between surfaces on the optical axis 110.
Nd: a refractive index of lens element.
Vd: an Abbe number of lens element.
h: a surface height from the optical axis 110.
k: a conic constant.

TABLE 1

| Surf. | Type | | R | L (mm) | Nd | Vd | H | K |
|---|---|---|---|---|---|---|---|---|
| Object | | | Infinity | Infinity | | | | |
| Even Asphere | First surface | First lens element | −106.77 | 1.50 | 1.53 | 56 | 5.72 | 0.00 |
| Even Asphere | Second surface | air space | 1.68 | 2.77 | | | 2.78 | −1.53 |
| Even Asphere | Third surface | Second lens element | −53.80 | 3.38 | 1.58 | 30 | 2.70 | 0.00 |
| Even Asphere | Fourth surface | air space | −4.35 | 2.05 | | | 2.40 | 0.00 |
| Even Asphere | Fifth surface | Third lens element | 4.18 | 0.69 | 1.53 | 56 | 1.16 | 0.00 |
| Even Asphere | Sixth surface | air space | −4.80 | −0.06 | | | 0.98 | 0.00 |
| Standard | aperture | air space | Infinity | 0.90 | | | 0.96 | 0.00 |
| Even Asphere | Seventh surface | Fourth lens element | −3.74 | 0.23 | 1.64 | 22.4 | 1.12 | 0.00 |
| Even Asphere | Eighth surface | air space | 2.20 | 0.05 | | | 1.40 | −8.73 |

TABLE 1-continued

| Surf. Type | | | R | L (mm) | Nd | Vd | H | K |
|---|---|---|---|---|---|---|---|---|
| Even Asphere | Ninth surface | Fifth lens element | 2.60 | 1.24 | 1.53 | 56 | 1.58 | −7.95 |
| Even Asphere | Tenth surface | air space | −2.66 | 1.00 | | | 1.68 | 0.60 |
| Even Asphere | Eleventh surface | Sixth lens element | 2.69 | 0.58 | 1.53 | 56 | 2.19 | 0.00 |
| Even Asphere | Twelfth surface | air space | 5.42 | 0.62 | | | 2.17 | 0.00 |
| Standard | Front surface | IRCF | Infinity | 0.21 | 1.52 | 59 | | |
| Standard | Rear surface | air space | Infinity | 0.84 | | | | |
| sensor | | | Infinity | — | | | 2.40 | |

TABLE 2

| Aspheric coefficient | | A2 | A4 | A6 | A8 |
|---|---|---|---|---|---|
| First lens element | First surface | 0 | 0.000258 | 0 | 0 |
| | Second surface | 0 | 0.006916 | −0.00037 | 3.53E−05 |
| Second lens element | Third surface | 0 | −0.0104 | 0.000394 | 6.57E−06 |
| | Fourth surface | 0 | 0.00241 | 0.00034 | −3.7E−05 |
| Third lens element | Fifth surface | 0 | 0.019271 | 0.001939 | 0.000391 |
| | Sixth surface | 0 | 0.020958 | −0.00218 | 9.24E−05 |
| Fourth lens element | Seventh surface | 0 | −0.07467 | 0.026453 | −0.01015 |
| | Eighth surface | 0 | −0.01467 | 0.004254 | −0.00109 |
| Fifth lens element | Ninth surface | 0 | 0.003438 | −0.00017 | 0.000412 |
| | Tenth surface | 0 | −0.01207 | 0.011062 | −0.00063 |
| Sixth lens element | Eleventh surface | 0 | −0.02853 | −0.00145 | 0.001482 |
| | Twelfth surface | 0 | −0.00067 | −0.00996 | 0.003329 |

According to an example of an optical lens system of the first embodiment, (EFLG1−EFLG2)/(EFLG1+EFLG2)=0.95; T45*D8/D9=0.044; (V3−V4)/(N4−N3)=297; (V5−V4)/(N4−N5)=297; (f1*f3)/(f4*f5)=2.30; TTL/(D1*IMH)=0.30; 2ω=120°; |D1/D2|=2.06; |D2/S2|=2.56.

Figure 2:
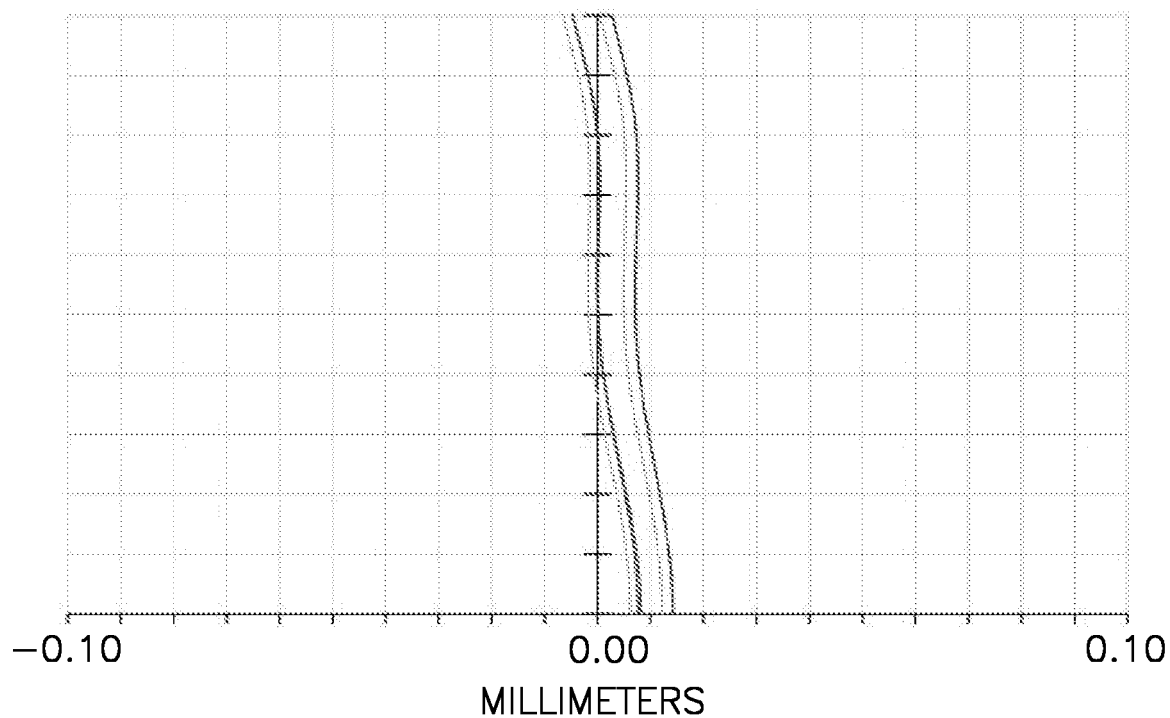
FIG. 2 is a graph showing longitudinal spherical aberration of the optical lens system of a first embodiment.
Figure 3:
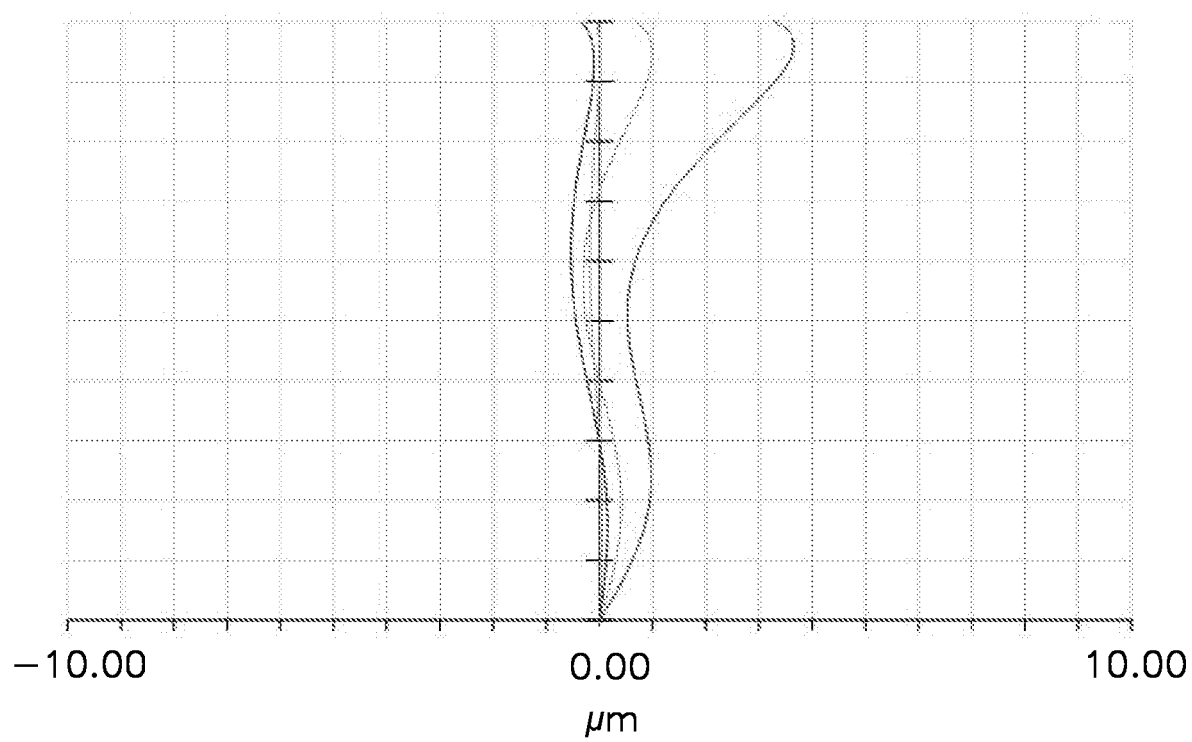
FIG. 3 is a graph showing lateral color aberration of the optical lens system of the first embodiment.
Figure 4:
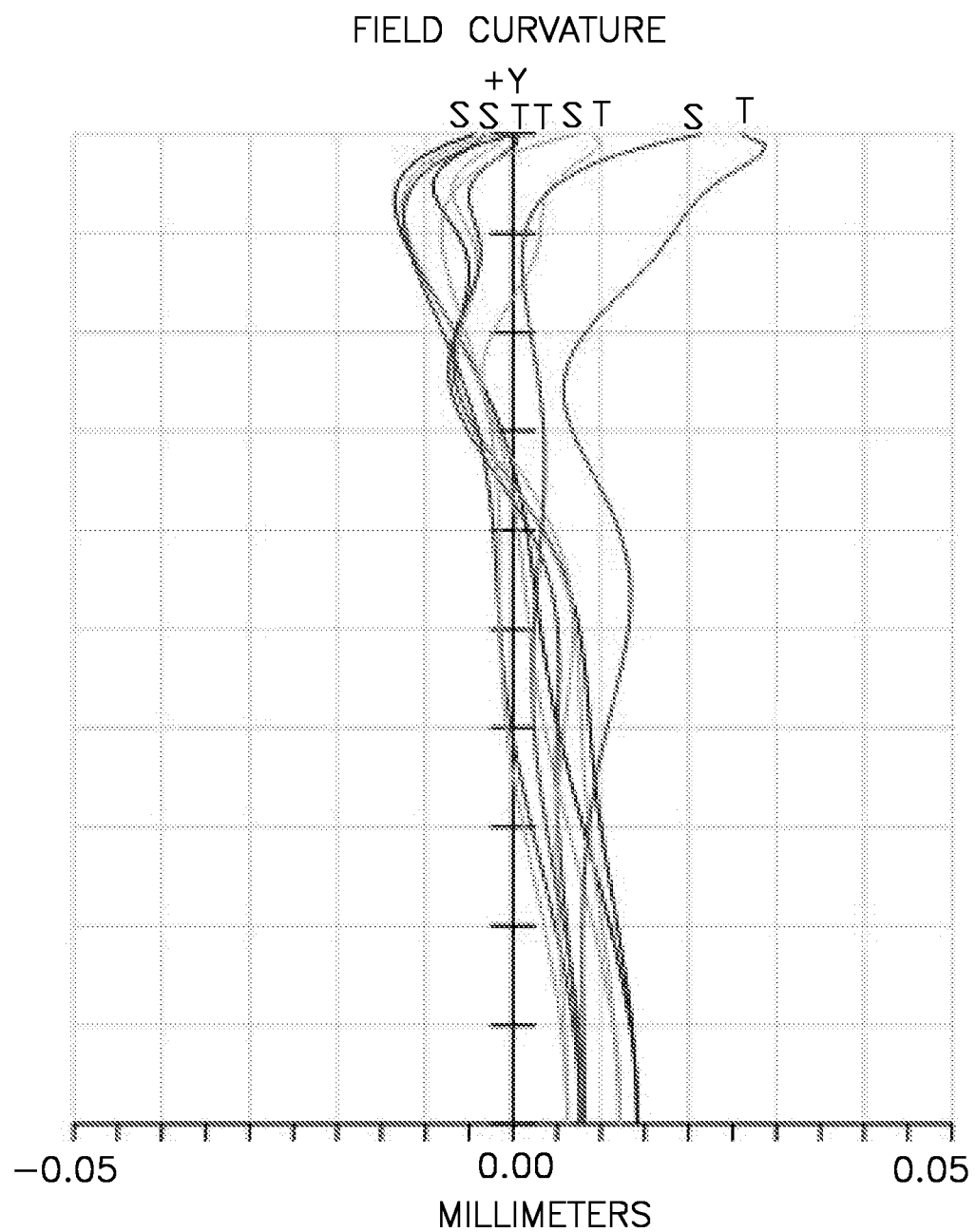
FIG. 4 is a graph showing field curvature of the optical lens system of the first embodiment.
Figure 5:
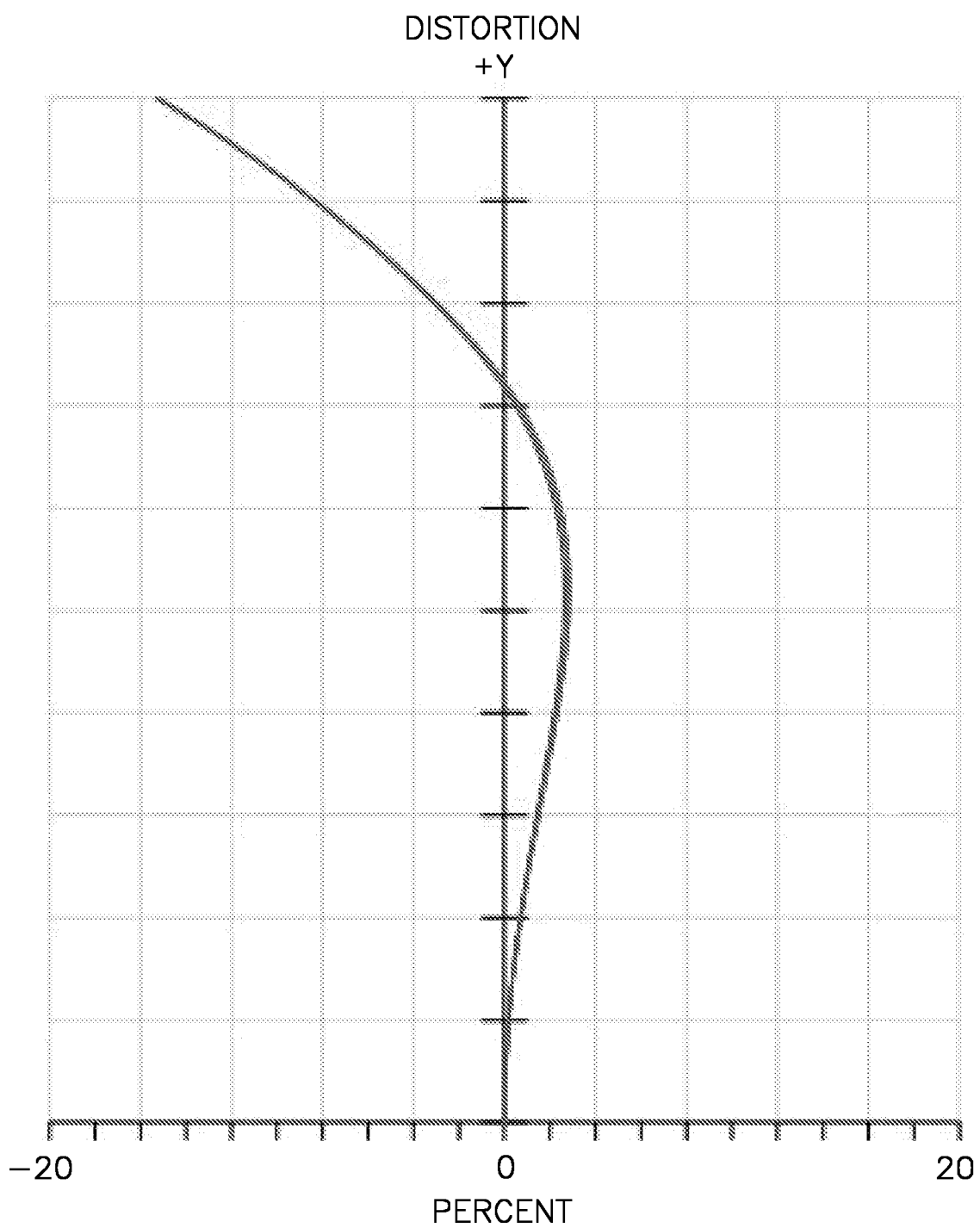
FIG. 5 is a graph showing distortion of the optical lens system of the first embodiment.

In the first embodiment, the longitudinal spherical aberration graph, the lateral color aberration graph, the field curvature graph, and the distortion graph of the optical lens system are shown in FIGS. 2-5, respectively. Generally, in the optical lens system of the disclosure, the longitudinal spherical aberration of visible light (with a wavelength between 400-700 nm) is shown in FIG. 2 and within a range of −0.01~0.02 mm. in the optical lens system of the disclosure, the lateral color aberration of visible light shown in FIG. 3 is kept in −1 μm-4 μm. In the optical lens system of the disclosure, the sagittal field curvature and the tangential field curvature of visible light are shown in FIG. 4 and kept at about −0.02 mm~0.03 mm. In the optical lens system of the disclosure, the distortion of visible light is shown in FIG. 5 and falls within a range of −20%~2%. In the first embodiment, the optical lens system of the disclosure, the longitudinal spherical aberration, field curvature, and distortion are tightly or accurately precisely controlled.

Tables 3-4 illustrate an optical lens system of a second embodiment. In the second embodiment, the optical lens system satisfies the parameters of Tables 3-4. The symbols listed below are used in Tables 3-4.

R: a radius of curvature.
L: a distance between surfaces on the optical axis 110.
N: a refractive index of lens element.
V: an Abbe number.
h: a height from the optical axis 110 to the surface.
k: a conic constant.

TABLE 3

| Surf. Type | | | R | L (mm) | Nd | Vd | H | K |
|---|---|---|---|---|---|---|---|---|
| Object | | | Infinity | Infinity | | | | |
| Even Asphere | First surface | First lens element | −33.88 | 1.42 | 1.53 | 56 | 4.71 | 1.08 |
| Even Asphere | Second surface | air space | 1.67 | 2.70 | | | 5.52 | −1.50 |
| Even Asphere | Third surface | Second lens element | −45.17 | 3.40 | 1.58 | 30 | 2.68 | −166.10 |
| Even Asphere | Fourth surface | air space | −4.32 | 2.09 | | | 2.54 | 0.00 |
| Even Asphere | Fifth surface | Third lens element | 4.08 | 0.44 | 1.53 | 56 | 2.31 | 0.32 |
| Even Asphere | Sixth surface | air space | −4.82 | −0.03 | | | 1.11 | 0.53 |
| Standard | aperture | air space | Infinity | 0.91 | | | | |
| Even Asphere | Seventh surface | Fourth lens element | −3.73 | 0.26 | 1.64 | 22.4 | 0.98 | 0.28 |
| Even Asphere | Eighth surface | air space | 2.17 | 0.05 | | | 1.11 | −8.55 |
| Even Asphere | Ninth surface | Fifth lens element | 2.59 | 1.14 | 1.53 | 56 | 1.39 | −8.17 |
| Even Asphere | Tenth surface | air space | −2.67 | 1.06 | | | 1.53 | 0.62 |
| Even Asphere | Eleventh surface | Sixth lens element | 2.67 | 0.58 | 1.53 | 56 | 1.62 | 0.02 |
| Even Asphere | Twelfth surface | air space | 5.10 | 0.64 | | | 2.15 | 0.43 |

TABLE 3-continued

| Surf. Type | | | R | L (mm) | Nd | Vd | H | K |
|---|---|---|---|---|---|---|---|---|
| Standard | Front surface | IRCF | Infinity | 0.21 | 1.52 | 59 | | |
| Standard | Rear surface | air space | Infinity | 0.84 | | | | |
| sensor | | | Infinity | — | | | 2.30 | |

TABLE 4

| Aspheric coefficient | | A2 | A4 | A6 | A8 |
|---|---|---|---|---|---|
| First lens element | First surface | 0 | 0.000253 | −2.1E−07 | −7.1E−09 |
| | Second surface | 0 | 0.007018 | −0.00037 | 3.26E−05 |
| Second lens element | Third surface | 0 | −0.01026 | 0.00038 | 4.43E−06 |
| | Fourth surface | 0 | 0.00245 | 0.000335 | −3.6E−05 |
| Third lens element | Fifth surface | 0 | 0.019904 | 0.002489 | 0.000738 |
| | Sixth surface | 0 | 0.020302 | −0.00189 | 0.000634 |
| Fourth lens element | Seventh surface | 0 | −0.07531 | 0.025082 | −0.0101 |
| | Eighth surface | 0 | −0.01347 | 0.004239 | −0.00121 |
| Fifth lens element | Ninth surface | 0 | 0.002558 | −0.00029 | 0.000422 |
| | Tenth surface | 0 | −0.01335 | 0.010811 | −0.0006 |
| Sixth lens element | Eleventh surface | 0 | −0.02768 | −0.00141 | 0.001466 |
| | Twelfth surface | 0 | −0.00038 | −0.00991 | 0.003315 |

According to an example of the optical lens system of the second embodiment, wherein: (EFLG1−EFLG2)/(EFLG1+EFLG2)=1.00; T45*D8/D9=0.047; (V3−V4)/(N4−N3)=297; (V5−V4)/(N4−N5)=297; (f1*f3)/(f4*f5)=2.20; TTL/(D1*IMH)=0.32; 2ω=147.7°; |D1/D2|=2.06; |D2/S2|=2.64.

In the second embodiment, the longitudinal spherical aberration graph, the lateral color aberration graph, the field curvature graph, and the distortion graph of the optical lens system are respectively shown in FIGS. 6-9.

Figure 6:
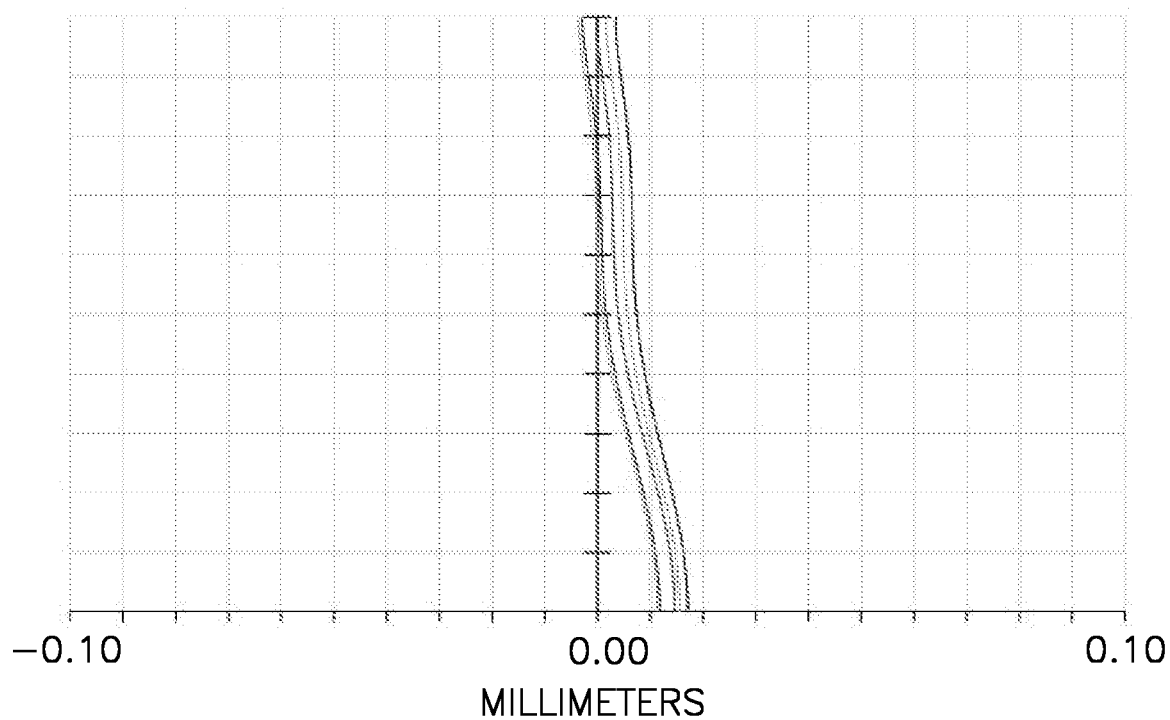
FIG. 6 is a graph showing longitudinal spherical aberration of the optical lens system of a second embodiment.
Figure 7:
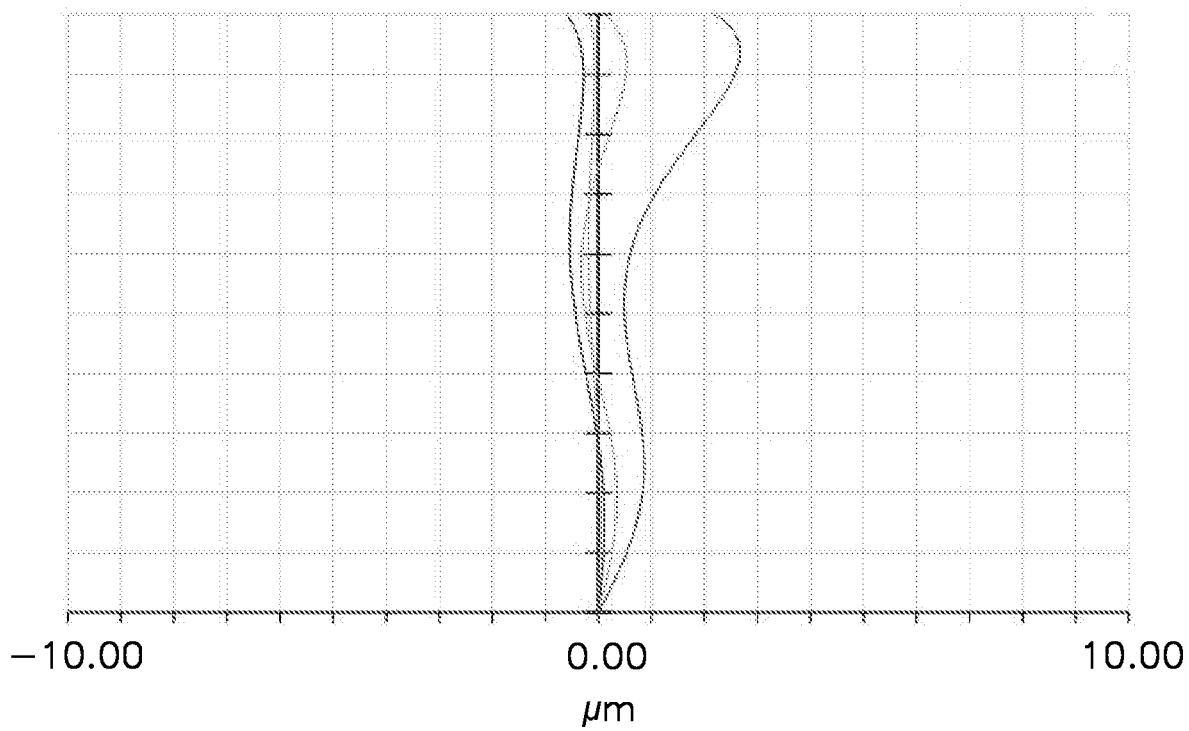
FIG. 7 is a graph showing lateral color aberration of the optical lens system of the second embodiment.
Figure 8:
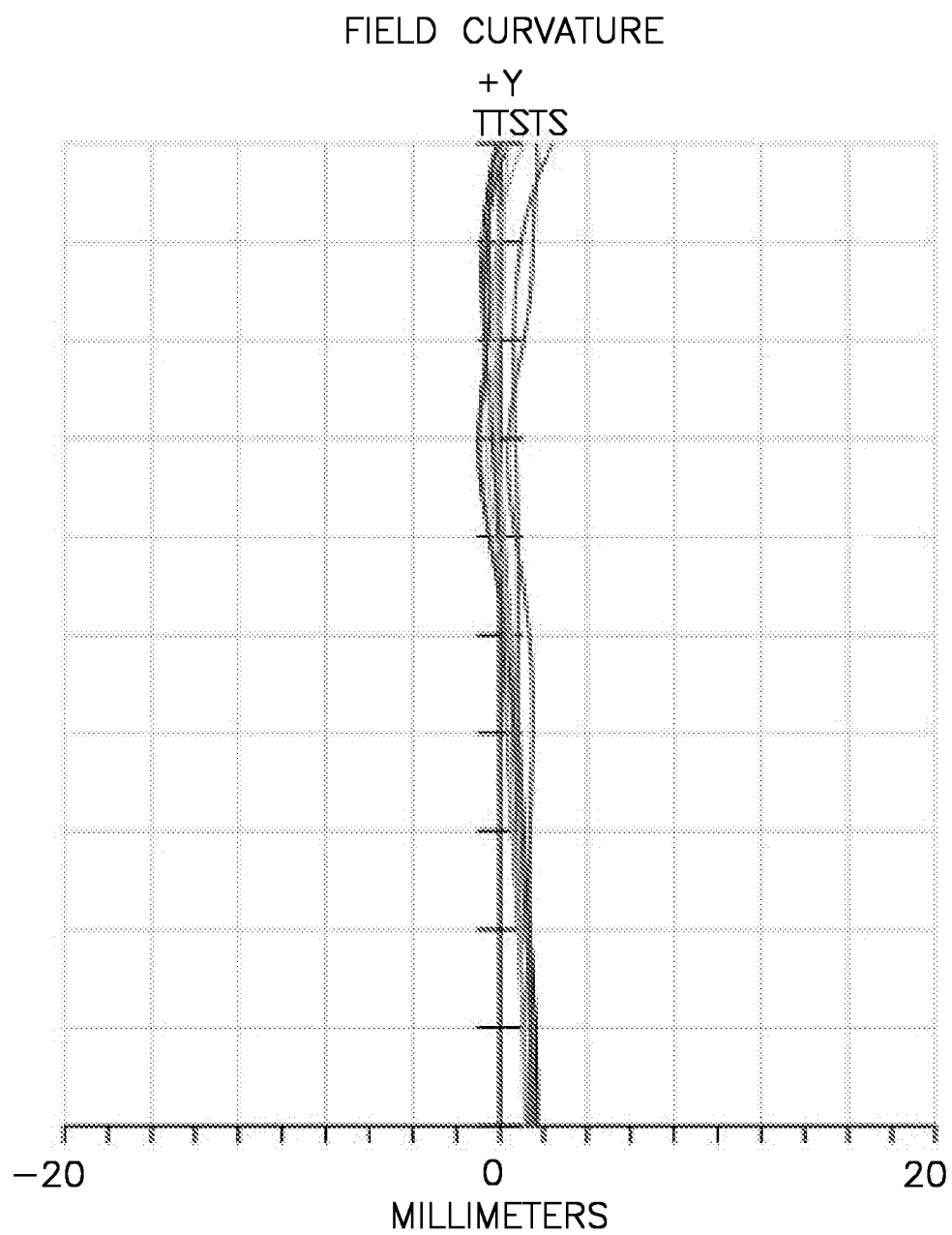
FIG. 8 is a graph showing field curvature of the optical lens system of the second embodiment.
Figure 9:
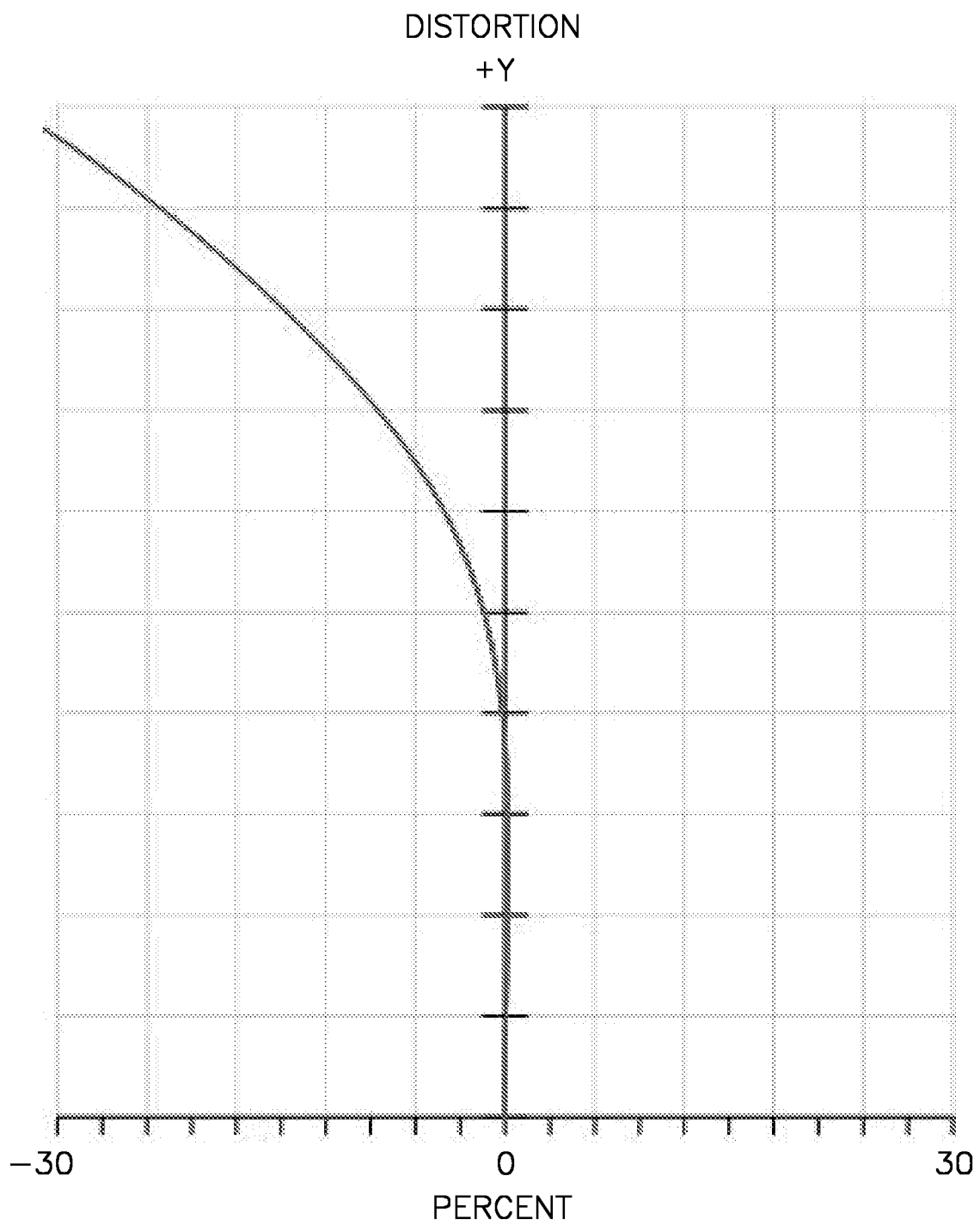
FIG. 9 is a graph showing distortion of the optical lens system of the second embodiment.

The longitudinal spherical aberration of visible light (with a wavelength between 400-700 nm) shown in FIG. 6 is within a range of −0.01 mm~0.02 mm. The lateral color aberration of visible light shown in FIG. 7 is kept in −1 μm~3 μm. The sagittal field curvature and the tangential field curvature of visible light shown in FIG. 8 are kept in −4 mm~4 mm. The distortion of visible light in FIG. 9 falls within a range of −30%~0. Obviously in the second embodiment, the longitudinal spherical aberration, field curvature, and distortion are well controlled in the optical lens system.

The embodiments shown and described above are only examples. Many details are often found in the art such as the other features of an optical lens system. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens system having an optical axis, the optical lens system comprising a lens group and a sensor in order from an object side of the lens system to an image side of the lens system, the lens group consisting of in order from the object side of the lens system to the image side of the lens system:

a first lens element having a first surface and a second surface opposite to the first surface;
a second lens element having a third surface and a fourth surface;
a third lens element having a fifth surface and a sixth surface;
a fourth lens element having a seventh surface and an eighth surface;
a fifth lens element having a ninth surface and a tenth surface; and
a sixth lens element having an eleventh surface and a twelfth surface;
wherein, the first lens element and the fourth lens element each have a negative power, the second lens element, the third lens element, the fifth lens element and the sixth lens element each have a positive power, the first surface is convex about the optical axis and toward the object side, the second surface is concave about the optical axis and toward the image side, the third surface is concave about the optical axis and toward the object side, the fourth surface is convex about the optical axis and toward the image side, the fifth surface is convex about the optical axis and toward the object side, the sixth surface is convex about the optical axis and toward the image side, a center of the seventh surface is concave about the optical axis and toward the object side, the eighth surface is concave about the optical axis and toward the image side, the ninth surface is convex about the optical axis and toward the object side, the tenth surface is convex about the optical axis and toward the image side, the eleventh surface is convex about the optical axis and toward the object side, the twelfth surface is concave about the optical axis and toward the image side, the optical lens system satisfies the following formula:

$$0.88 < (EFLG1 - EFLG2)/(EFLG1 + EFLG2) < 1.11;$$

wherein EFLG1 is the focal length of the first lens group, EFLG2 is the focal length of the second lens group.

2. The optical lens system of claim 1, wherein an aperture is located between the third lens element and the fourth lens element, a distance between the aperture and the sixth surface is less than a distance between the aperture and the seventh surface.

3. The optical lens system of claim 1, wherein the optical lens system also comprises an optical filter, the optical filter located between the sixth lens element and the sensor, the optical filter is spaced from the sixth lens element and the sensor.

4. The optical lens system of claim 3, wherein the optical filter has a front surface and a rear surface, the front surface and the rear surface are flat planes.

5. The optical lens system of claim 1, wherein the optical lens system satisfies the formula: 0.01<T45*D8/D9<0.71, wherein T45 is a center thickness of air space between the eighth surface and the ninth surface, D8 is the diameter of eighth surface, D9 is the diameter of the ninth surface.

6. The optical lens system of claim 1, wherein the optical lens system satisfies the formulas: $20<(V3-V4)/(N4-N3)<1020$, $20<(V5-V4)/(N4-N5)<1020$, wherein V3 is the abbe number of the third lens element, V4 is the abbe number of the fourth lens element, V5 is the abbe number of the fifth lens element, N3 is the refraction index of the third lens element, N4 is the refraction index of the fourth lens element, N5 is the refraction index of fifth lens element.

7. The optical lens system of claim 1, wherein the optical lens system satisfies the formula: $1.14<(f1*f3)/(f4*f5)<4.57$, f1 is the focal length of the first lens element, f3 is the focal length of the third lens element, f4 is the focal length of the fourth element, f5 is the focal length of the fifth lens element.

8. The optical lens system of claim 1, wherein the optical lens system satisfies the formulas: $0.1<TTL/(D1*IMH)<0.91$, wherein TTL is total length from a center point of the first surface to the sensor along the optical axis, D1 is aperture diameter of the first lens element.

9. The optical lens system of claim 1, wherein the optical lens system satisfies the formula: $100°<2\omega<179°$, wherein $\omega$ is a half field view angle of the optical lens system.

10. The optical lens system of claim 1, wherein the optical lens system satisfies the formula: $1.36<|D1/D2|<4.78$, wherein D1 is aperture diameter of the first lens element, D2 is aperture diameter of the second lens element.

11. The optical lens system of claim 1, wherein the optical lens system satisfies the formula: $1.53<|D2/S2|<5.63$, wherein D2 is aperture diameter of the second lens element, S2 is a sag value of a maximum effective aperture of the second surface of the first lens element.

12. The optical lens system of claim 3, wherein the first lens element, the second lens element, the third lens element, the fourth lens element, the fifth lens element and the sixth lens element are symmetrical about the optical axis.

* * * * *